weight water-insoluble polymers which have an unexpectedly high aldehyde function and can be readily dissolved in aqueous sulfur dioxide or bisulfite solutions to form solutions of high solids content. The new process comprises effecting polymerization of the unsaturated aldehyde in a liquid medium made up of a mixture of water and a lower aliphatic ketone, and preferably acetone, which mixture preferably contains less than about 25% by weight of water, using a redox polymerization catalyst system, the reaction mixture preferably being maintained under a blanket of inert gas and preferably being agitated during the course of the reaction.

United States Patent Office 3,310,531
Patented Mar. 21, 1967

3,310,531
PROCESS FOR POLYMERIZING UNSATURATED ALDEHYDES AND RESULTING PRODUCTS
Elliott E. Ryder, Jr., Alameda, and Ronald K. June, Pleasant Hill, Calif., assignors to Shell Oil Company, New York, N.Y., a corporation of Delaware
No Drawing. Filed Jan. 17, 1964, Ser. No. 338,287
13 Claims. (Cl. 260—67)

This invention relates to a new process for polymerizing unsaturated aldehydes. More particularly, the invention relates to a new process for polymerizing unsaturated aldehydes to form low molecular weight polymers having improved properties, and to the resulting polymers.

Specifically, the invention provides a new and highly efficient process for converting alpha,beta-ethylenically unsaturated aldehydes, such as acrolein, to low molecular weight water-insoluble polymers which have an unexpectedly high aldehyde function and can be readily dissolved in aqueous sulfur dioxide or bisulfite solutions to form solutions of high solids content. The new process comprises effecting polymerization of the unsaturated aldehyde in a liquid medium made up of a mixture of water and a lower aliphatic ketone, and preferably acetone, which mixture preferably contains less than about 25% by weight of water, using a redox polymerization catalyst system, the reaction mixture preferably being maintained under a blanket of inert gas and preferably being agitated during the course of the reaction.

As a special embodiment, the invention provides a process for preparing homopolymers and copolymers of acrolein which have low molecular weights, a high aldehyde function and good solubility in sodium bisulfite, and can be recovered as finely divided free-flowing powders, which process comprises effecting polymerization of the acrolein or mixture of monomers containing acrolein in a liquid medium containing acetone and water and an additive, such as allyl alcohol, using as a catalyst system, a mixture of a hydroperoxide and a sulfur-containing reducing agent.

It is known that low molecular weight polymers of acrolein known as "disacryl" can be obtained by allowing the acrolein to remain exposed to light and air, or by heating the acrolein to a high temperature in the presence of a peroxide catalyst. These polymers, however, are of little practical utility because of their poor solubility characteristics and poor reactivity in general. This is due chiefly to the fact that while the polymers should posses a high degree of reactive aldehyde groups, the said aldehyde groups react during polymerization to form cross-links between polymer chains or form cyclic acetal linkages along the same polymer chain. Such inter-reaction renders the polymers highly insoluble and relatively inert to reaction with other materials. Only by using difficult procedures can one dissolve the polymers or convert them to useable materials.

It is an object of the invention, therefore, to provide a new process for polymerizing unsaturated aldehydes, such as acrolein. It is a further object to provide a new process for converting alpha,beta-ethylenically unsaturated aldehydes to low molecular weight polymers. It is a further object to provide a process for preparing low molecular weight polymers of unsaturated aldehydes that have a high degree of reactivity and solubility in bisulfite solutions. It is a further object to provide new low molecular weight active polymers which can be dissolved in bisulfite solutions to form aqueous solutions having high solids content. It is a further object to provide a process for preparing low molecular weight polymers which can be easily recovered as finely divided substantially dry powders. It is a further object to provide a process for preparing polymers which are recoverable as powders without the use of emulsifying agents. It is a further object to provide a process for preparing new low molecular weight active polymer sof unsaturated aldehydes which are particularly useful and valuable in industry. It is a further object to provide new low molecular weight polymers which can be converted to soluble derivatives which are particularly useful as adhesives and insolubilizing agents for starch and the like. These and other objects of the invention will be apparent from the following detailed description thereof.

It has now been discovered that these and other objects may be accomplished by the process of the invention which comprises effecting polymerization of the unsaturated aldehyde in a liquid medium made up of a mixture of water and a lower aliphatic ketone, and preferably acetone, which mixture preferably contains less than about 25% by weight of water, using a redox polymerization catalyst system, the reaction mixture preferably being maintained under a blanket of inert gas and being agitated during the course of the reaction. It has been found that by the use of this special process one is able to obtain low molecular weight polymers of the unsaturated aldehydes which have surprisingly high aldehyde function. It has been found, for example, that while the conventional polymers, such as the above-noted disacryl polymers, have an aldehyde function of 0 to about 10%, the products obtained by the present process have a theoretical aldehyde function of at least 85% and preferably at least 95% up to 99+%. Further, the new polymers have a high degree of solubility in sodium bisulfite solutions or aqueous sulfur dioxide solutions and are capable of forming therewith solutions of high polyacrolein content, e.g., up to about 30%, without danger of gelation. The new process also forms the polymers in such a state that they can be easily recovered and dried, as by the use of pipeline dryers as noted herein after, to form substantially dry finely divided powders.

It has been further found that the solutions of the new low melocular weight polymers is sodium bisulfite or aqueous sulfur dioxide are outstanding materials for use in making wood adhesives or as agents for insolubilizing starch and the like.

The process of the invention comprises effecting polymerization of the unsaturated aldehydes in a liquid medium containing water and a lower ketone. Examples of such ketones include, among others, acetone, diethyl ketone, methyl ethyl ketone, methyl isopropyl ketone, diisopropyl ketone and the like. Particularly preferred ketones to be employed include the dialkyl ketones containing no more than 8 carbon atoms, and more preferably not more than 6 carbon atoms. Acetone comes under special consideration because of the superior results obtained therewith.

The amount of the lower ketone and water to be used in the reaction medium may vary within a certain range. It is desired to keep the amount of water as low as possible. Preferred amounts of water range from about 5% to about 25% by weight of the said mixture. Particularly preferred amounts range from about 5% to 15% by weight.

The catalyst system used in the process of the invention comprises a free radical yielding catalyst and a reducing agent. Examples of free radical yielding catalysts that may be employed include, among others, peroxides, such as benzoyl peroxide, hydrogen peroxide, potassium persulfate, potassium permanganate, methyl cyclohexyl peroxide, alkali perborates, diacetyl peroxide, tertiary butyl hydroperoxide, tertiary amyl hydroperoxide, acetyl benzoyl peroxide, cumene hydroperoxide, tetralin hydroperoxide, phenylcyclohexane hydroperoxide, tertiary butylisopropylbenzene hydroperoxide, tertiary butyl per-acetate, tertiary butyl perbenzoate, ditertiary butyl perphthalate, ditertiary butyl peradipate, tertiary amyl percarbonate, and the like. Particularly preferred free radical yielding catalysts include the peroxides, such as the diaroyl peroxides, tertiary alkyl hydroperoxide, alkyl peresters of percarboxylic acids, and particularly those of the above-noted groups which contain no more than 18 carbon atoms per molecule.

The above-described free radical yielding catalysts are employed in small amounts, the exact amount being dependent upon the particular type selected and molecular weight of polymer desired. In general, the amount of catalyst used will vary from about $1 \times 10^{-6}$ to $2 \times 10^{-2}$ mols per mol of unsaturated aldehyde being polymerized. Preferred amounts vary from about $1 \times 10^{-3}$ to $1 \times 10^{-2}$ mols per mol of material being polymerized. In general, use of larger amounts of catalyst tend to reduce molecular weight. Accordingly, if one desires to increase molecular weight it is desired to use smaller amounts of catalyst.

Any of the known reducing agents may be employed with the above-described free radical yielding catalysts. These include, among others, polyamines, such as tetraethylene pentamine, tertiary amines, such as dimethyl aniline, adducts of sulfur dioxide and aldehydes and ketones, thiosulfates, bisulfites, aqueous sulfur dioxides solutions, adducts of sulfur dioxide and polymeric aldehydes such as produced by the present process and various multivalent metals, i.e., those metals which can change their valence state reversibly, such as, for example, iron manganese, copper, vanadium, cobalt, nickel, tin, silver, titanium, etc. When added to the reaction mixture, the metal must be at least in part in a lower valence state, such as, for example, ferrous chloride, silver nitrate, titanium dichloride, cobaltous chloride, ferrous pyrophosphate, potassium ferrocyanide, cobaltous chloride, ferrous pyrophosphate, potassium ferrocyanide, manganous sulfate, ferrous sulfate, and the like. The anion portion of the metal salt may be of any amount as long as the resulting salt has the necessary solubility in the reaction medium.

Particularly preferred reducing agents include those which release $SO_2$ if heated, such as, for example, the sulfites and bisulfites, aqueous $SO_2$, $SO_2$ adducts and the like.

The amount of the reducing agent employed will depend upon the amount of the peroxide catalyst utilized. It is preferred to have at least an equivalent amount of the reducing agent per equivalent amount of peroxide catalyst. With reference to the sulfur dioxide containing reducing agents, an equivalent amount refers to that amount needed to release 1 mol of sulfur dioxide per mol of the peroxide catalyst. As for the metals, it is preferred to have at least one equivalent of the metal per equivalent of the peroxide catalyst, and more preferably .5 to 1 equivalent per equivalent of peroxide.

The reaction is preferably conducted at a pH between 1 to 6, and still more preferably between 2 and 5.

It is sometimes desirable to employ additives in the reaction mixture to assist in obtaining the desired molecular weight range. Examples of such materials include allyl alcohol, isopropyl alcohol, isoamyl alcohol, butenol and the like. Amounts of these additives should be small and should not exceed 25% by weight of the monomer.

The polymerization is also preferably conducted in an inert atmosphere. This may be accomplished by passing inert gases, such as nitrogen, methane, etc. over the reaction mixtures or into and through the reaction mixture.

The temperature employed in the process may vary over a considerable range. It is generally preferred to employ relatively low temperatures, e.g., temperatures below about 50° C. In general, temperatures will vary from the freezing point of the reaction mixture to about 50° C. Preferred temperatures range from about 0° C. to 25° C.

The reaction mixture is preferably agitated during the reaction. This may be accomplished by use of stirrers, tumbling of the reactor and the like. When using stirrers, is it preferred to stir at a rate of 20 to 800 r.p.m.

The polymer will form as insoluble white particles. The agitation will tend to keep the particles suspended, but when the agitation is stopped, the particles will settle to the bottom of the reaction. The polymer may be recovered from the reaction mixture by any suitable means, such as filtration, centrifugation and the like. After recovery, it may be desirable to wash the polymer with suitable liquid material, such as methanol, acetone, isopentane and the like.

The drying of large amounts of polymer is preferably accomplished by adjusting the pH to about 4 and introducing the reaction slurry into a pipeline dryer as described in copending application Serial Number 334,383, filed December 30, 1963, now abandoned. The polymer resulting from this process is substantially dry and contains at most 15 to 20% water.

The polymers prepared by the claimed process are solid substantially white low molecular weight products. They have intrinsic viscosities (as determined on the solubilized form) preferably between 0.08 to 0.5 dl./g. These values are determined by the conventional technique of polyelectrolyte viscosity measurement at 25° C. On a molecular weight basis, such polymers have molecular weights ranging from about 5,000 to 75,000 as determined by the light scattering technique.

The polymers are also recovered as finely divided dry-to-the-touch pulverizable form. In this regard, they are distinguished from the products prepared by the conventional water techniques for polymerizing unsaturated aldehydes.

The polymers are characterized by the fact that they have a high aldehyde function, e.g., an aldehyde function of over 85% and preferably over about 95%, i.e., when the polymer is subjected to conventional test for presence of aldehyde groups (e.g., addition of hydroxylamine hydrochloride and titrate liberated water with Karl Fischer reagent) the results show that over 85% or 95% of the theoretical aldehyde groups present by addition polymerization at the double bonds are present in the polymer as such or in hydrated form. Further analysis has shown that the polymer contains many groups wherein the aldehyde is in a hydrated form as

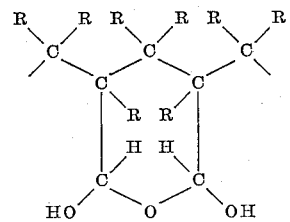

and some

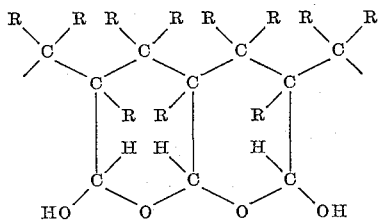

wherein R is hydrogen or hydrocarbon and particularly alkyl, cycloalkyl and aryl radicals containing 1 to 10 carbon atoms. This clearly distinguishes the polymers of the invention from those produced by conventional methods wherein the polymer possesses at most 0–10% of the theoretical aldehyde function.

The polymers are also characterized by being insoluble in water and insoluble in conventional solvents, such as benzene, toluene, acetone and the like.

While the above-described polymers may be utilized as such by molding at high temperatures to form plastic articles, they have been found to be of greatest use in the solubilized form.

The water-soluble derivatives of the new polymers may be obtained by a variety of methods. They are preferably prepared by suspending the polymer in an aqueous solution containing the water-solubilizing agent, such as, for example, those which release $SO_2$ when heated, such as aqueous sulfur dioxide or an alkali bisulfite, as sodium bisulfite. The amount of the polymer added will vary depending on the particular agent involved and the concentration of the agent. In general, it is preferred to add from 1 to 50 parts of the polymer per 100 parts of the water. The concentration of the solubilizing agent will generally vary from about 1% to about 50%. Stirring and heating may be applied to assist in the dissolution. Temperatures employed will generally vary from about 20° C. to about 90° C. Various other means, such as additions of small amounts of acid catalyst or the addition of swelling agents, such as tetrahydrofuran, may also be employed to assist in the dissolution.

The preferred water-soluble derivatives are those wherein the carbon to sulfur ratio is at least 4:1 and preferably at least 9:1. These can be obtained by controlling the amount of sulfur dioxide containing material employed in the reaction. Thus, one determines the aldehyde function of the polymer as noted so as to find the available aldehyde groups and then calculate how many aldehyde groups should be reacted to give the right C to S (S derived from the $SO_2$) ratio. In case of polyacryloein having 100% aldehyde groups, for example, to get a ratio of 9:1 one should use 1 mol of the sulfur dioxide-containing material for every three mols of acrolein in the polymer.

The water-soluble derivatives will have substantially the same molecular weight as the water-insoluble basic polymer. In the case of the sulfur dioxide and bisulfite, the polymer will also contain a plurality of free sulfonic groups or water-soluble salt sulfonate groups contained in the polymer molecule and therefore may be regarded as polymeric polysulfonic acids and polymeric polysulfonate metal salts. For example, the polymer will contain

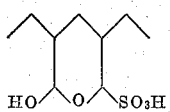

groups. (The backbone of the polymer is as described above.)

The water solubilized polymers may be used for a great many applications. As water solutions, they may be used in the formation of films, threads, treatment of animal skins, and the like, and as coatings for various materials as wood, metal and the like.

The polymers solubilized with alkali bisulfites and aqueous sulfur dioxide have been found to be particularly useful as adhesives for wood and as insolubilizing agents for starch, etc.

The adhesive compositions are prepared by adding the above-noted water solubilized derivative of the aldehyde polymer to water to form a solution having the desired solids content. If the derivative was formed in an aqueous medium as noted above, that solution may be used in making the adhesive without first isolating the derivative.

The solutions preferably have a polyacrolein content of at least 5% and preferably between 5% and 30%.

Other desired materials may be added to the adhesive as needed. These include, among others, fillers, such as asbestos, crushed walnut shells, wood flours, powdered aluminum, iron, silica, and the like, pigments, other resins, dyes, stabilizers, plasticizers and the like.

The above-noted adhesives are utilized by merely applying the solutions to the desired surface or surfaces to be bonded together. The application can be made by any suitable means, such as spreading with a doctor blade, spraying, dipping, painting and the like. One or both of the surfaces to be bonded may be treated in this manner. In general, it is preferred to merely apply the solution to one surface and superimpose the other surface thereon.

The thickness of the adhesive layer may vary over a wide range. In general, it is preferred to utilize a layer varying from 0.0005 to 0.1 inch thick.

After the adhesive has been applied and the sheets assembled together and pressure applied to secure the bond, the assembly may be allowed to set to cure the bonding material. The curing may be allowed to take place at room temperature, or heat may be applied to hasten the cure. Preferred temperatures range from about 20° C. to about 150° C. Pressures employed may vary from about 25 p.s.i. to 1000 p.s.i.

The adhesive may be used to bond two sheets together or a multiple layer of sheets such as in plywood. The multisheet laminated products are preferably prepared by assembling a lay-up of a plurality of sheets of the fibrous material impregnated with the above-noted adhesive composition, placing the assembly in a press and applying heat and pressure with the aid of the press. Especially with planar cloth laminates, it is helpful in attaining best strengths in all directions to have alternate layers of the material placed at 90° angles from the direction of weave. The assembly of superimposed and impregnated sheets can be cured at elevated temperatures and pressures. Moderate pressure are effective to secure smooth surface laminates such as up to 50 pounds per square inch but higher pressures may be employed if desired.

The laminated products can be prepared as flat sheets or in cured shapes. The form of the press platens will determine the shape of the finished laminate. Thus, curved products can be prepared by use of press platens that are arch-shaped or otherwise curved in one direction as well as platens with double curvature like a segment of a sphere.

The adhesive compositions can be used for the bonding of a great variety of different materials, such as those which are fibrous, porous or impervious. Examples of such materials include, among, others, wood, glass, class cloth, fabrics, paper, plaster of paris, metals and the like. Particularly preferred materials are the cellulosic materials as wood, paper and cellulosic fabrics as cotton. Results obtained from wood-to-wood bonding as in the preparation of particle board, plywood, and the like, are particularly outstanding.

The water-solubilized derivatives are also valuable as an insolubilizing agent for starch. In this case the water-soluble derivative is mixed with an aqueous dispersion of the starch. While the amount of the starch employed may vary over a wide range, but is generally preferred to utilize a minimum amount needed to form a suitatble uniform dispersion. In the case of starch and starch derivatives, for example, it is preferred to use from 1% to 40% solutions of the starch. Particularly superior results are obtained when the concentration of starch varies from 1% to about 20% by weight.

The amount of the water-soluble derivative of the aldehyde polymer to be employed may also vary over a considerable range, but it is preferred for economic reasons to use only the minimum amount required for imparting the desired water resistance. In general, amounts of water-soluble derivatives will vary from about .01% to about 20% by weight of the reaction mixture. In the case of starch, it is generally preferred to employ from 1% to 50% by weight of starch and from .01% to 10% by weight of the water-soluble derivative of the aldehyde polymer.

It is desirable to have the solution of the mixture at a pH which is neutral or preferably alkaline. Particularly superior results are obtained when the pH is between 7.5 to 13, and still more preferably between 8 and 12. The pH can be adjusted by the addition of regulators, such as sodium hydroxide, borax and the like.

Other desired materials may be added to the composition as desired. This includes fillers, such as clay, asbestos, wood flour, silica, powdered aluminum iron, and the like, pigments, other resins, dyes, stabilizers, plasticizers and the like.

The above-described starch compositions may be utilized in greater variety of different application. As indicated above, they may be used as water soluble sizing agents for textiles, yarns, fibers and the like, as adhesives for the bonding particularly for cellulosic materials together and as surface coatings for various types of surfaces and particularly those derived from cellulose. In the case of the water sizing agents, the compositions may be diluted with water and the textile materials passed into and through the aqueous solution as according to conventional procedure and then removed and dried. In case of the coating compositions, compositions may be spread out as a thin film on the desired surfaces and allowed to dry in air.

The above described starch compositions are particularly suitable for use as adhesives in the bonding of cellulosic materials such as laminated paper board and corrugated paper board. Laminated paper board is produced commercially by adhesively combining two or more smooth surfaced strips of paper in a continuous process. The manufacture of corrugated paper board is similar, except that at least one of the strips of paper is corrugated and is joined to the adjacent strip or strips of paper only at the tips of the corrugations. In both applications, the compositions of the invention may be applied to the proper surface or surfaces of the paper and the paper sheets placed together and cured under conventional temperatures and pressure, e.g., temperatures of 75 to 175° C. and contact pressure.

Other applications include preparation of paper tube winding, paper bags and the like.

The starch compositions of the invention are particularly valuable in the preparation of coating compositions. Heretofore, starch alone has been used quite extensively as a binder for pigments and the like because of its ease of preparation and availability. However, such starch coatings are not water-resistant as noted above, and a greater quantity of starch than casein is needed to bond pigments to the coated stock. Moreover, the adhesiveness of the starch is somewhat limited and the bonding film may be changed by reason of shrinking and separation due to retrogradation of the starch. Because of these difficulties starch has been somewhat limited to the coating field.

As noted above, when the products of the present invention are employed one obtains coatings which have good water resistance, good adhesion and there is no retrogradation of the starch.

The starch compositions of the invention may be used in a coating composition by mixing it with a suitable quantity of a filler and a dispersing agent in an aqueous medium. Any suitable or conventional filler used in coating compositions, such as, for example, clay, may be used. Similarly, any suitable dispersing agent conventionally used for dispersing the clay in coating compositions may be used. The type of starch which is used in this application will depend to some extent upon the type of coating desired. For example, a roll coating requires a starch of higher viscosity than does a brush coating. Consequently, a less modified starch or one of higher solids content is used for the roll coating.

For a coating composition, for example, one may combine an oxidized starch in combination with a polyacrolein-sodium bisulfite adduct and mix this with clay, water and a dispersing agent. Usually it is desirable to adjust the pH of the composition to a point suitable for satisfactory dispersion of the clay. This point is often near the neutral point or, with certain types of clay slightly on the alkaline side. The clay dispersion and the starch-polyacrolein derivative product may be separately dispersed in water, and the two dispersions mixed to produce the final coating composition.

Coating compositions made in accordance with the above possess improved printability, good water resistance and good adhesion to subsurfaces, such as cellulosic materials, paper, textiles, wood and the like.

The solvent-soluble derivatives of the above-described new low molecular weight polymers may be prepared by a variety of methods. They may be prepared, for example, by adding the solid polymer particles to a liquid medium containing a swelling agent, such as benzene, phenol and the like, an acid catalyst, such as p-toluenesulfonic acid, and a reactant diluent, such as an aliphatic or cycloaliphatic alcohol, such as methanol, ethanol, ethylene glycol, hexylene glycol, 1,5-pentanediol and the like. The amount of polymer added will generally vary from about 1 to 50 parts of polymer per 100 parts of solvent and swelling agent. The amount of catalyst employed will generally vary from about .1% to 5% by weight of the total solution. The amount of the swelling agent will vary from about 2 to 200 parts per 100 parts of the polymer. The amount of the reactive diluent employed will depend upon the degree of solubility and molecular structure change desired. If, for example, it is desired to convert all of the theoretical aldehyde groups to acetal groups, an excess over the theoretical amount of diluent needed to effect this change should be employed. In most cases, the amount of diluent employed will vary from about 10 parts to 1000 parts per 100 parts of the polymer.

Stirring and heating may be employed to assist in the formation of the solvent-soluble derivatives. In most cases, temperatures varying from about 20° C. up to and including reflux temperatures of the solution may be employed.

The solvent-soluble polymer derivatives are in most cases substantially white to light colored solids having substantially the same molecular white as the basic insoluble polymer. The acetal derivatives, for example, will contain units as

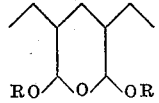

(The backbone of the polymer is as described above.) Wherein R is derived from the alcohol by removing an OH group, and is preferably an organic radical such as a hydrocarbon radical as an alkyl, aryl, and cycloalkyl radical.

The alpha,beta-ethylenically unsaturated aldehydes used in the process of the invention comprise those monoaldehydes having an ethylenic group in the alpha,beta-position relative to the aldehyde group, such as, for example, acrolein, and alpha- and beta-substituted acroleins, as methacrolein, alpha-ethylacrolein, alpha-butylacrolein, alpha - chloroacrolein, beta - phenylacrolein, alpha-decylacrolein, alpha-cyclohexylacrolein, and the like. Preferred aldehydes to be employed in making the polymers include the alpha,beta-monoethylenically unsaturated monoaldehydes containing from 3 to 12 carbon atoms, and especially acrolein and the alpha- and beta-substituted acroleins where the substituent on the alpha and/or beta positions is an alkyl, cycloalkyl or aryl group containing no more than 8 carbon atoms. 2-alkenals containing up to 8 carbon atoms come under special consideration.

The process of the invention may also be used to copolymerize the above-noted unsaturated aldehydes with another aldehyde or with another compound containing an ethylenic group, such as, for example acrylonitrile, methacrylonitrile, crontonaldehyde, acrylic acid, methacrylic acid, methyl acrylate, ethyl acrylate methyl methacrylate, butyl acrylate, vinyl acetate, dibutyl maleate, diethyl maleate, allyl acetate, allyl butyrate, allyl benzoate, vinyl benzoate, vinyl chloride, vinylidene chloride, styrene, butadiene, methylpentadiene, alpha-methylstyrene, vinylpyridine, N-vinylpyrolidone, acrylamide, N-methyl acrylamide, isoprene, 1,4-octadiene, diallyl phthalate, divinyl phthalate, divinyl adipate, ethylene, propylene, isobutylene, and the like, and mixtures thereof. Particularly preferred monomers to be employed include the alpha,beta-ethylenically unsaturated nitrile, the alkyl esters of acrylic and alpha-substituted acrylic acids, vinyl esters of monocarboxylic acids, allyl esters of monocarboxylic acids, olefins, diolefins, unsaturated esters of polycarboxylic acids, and nitrogen-containing monomers as the amides of unsaturated carboxylic acids, all members of the foregoing preferably containing no more than 12 carbon atoms each.

The amount of the above-described unsaturated monomers to be employed with the unsaturated aldehydes in making the copolymers may vary over a wide range. In general, the amount of dissimilar monomer may vary from about .1% to as high as 80 to 90% of the combined mixture. Preferred amounts of dissimilar monomer vary from about 1% to 50% by weight of the combined mixture.

To illustrate the manner in which the invention may be carried out, the following examples are given. It is to be understood, however, that the examples are for the purpose of illustration and the invention is not to be regarded as limited to any of the specific materials or conditions recited therein.

Unless otherwise indicated, parts are parts by weight. Viscosities reported were determined at 25/ C. using 0.5 N sodium sulfate diluent after dissolving the polymers in aqueous saturated sulfur dioxide solution and removing the excess sulfur dioxide under vacuum.

Example I

This example illustrates the superior results obtained by polymerizing acrolein in a water-acetone mixture.

508 parts of acetone were combined with 197 parts of acrolein (95.3% pure and containing .1 part phenolic inhibitor) and 4.25 parts of tertiary butyl hydroperoxide (71% pure). To this mixture over a period of 3 hours was added a water solution made up of 56 parts of a 3.83% solution of sulfur dioxide in acetone and 104.4 parts of water. The pH of the solution was about 2. The mixture was stirred and kept under nitrogen at 20° C. to 25° C. during the addition. At the conclusion of the reaction, the polymer was separated from the mixture, which was now a fluid milky appearing slurry, by filtration. The filter cake was then rinsed twice with fresh acetone, twice with isopentane and finally dried by drawing air through the filter. The resulting product was a finely divided white solid polymer identified as an addition polymer of acrolein. The polymer was obtained in 42% yield and had an intrinsic viscosity of 0.13 dl./g. and an aldehyde function of 99+%.

The low molecular weight polymer prepared above was dissolved rapidly in aqueous sodium bisulfite solution to form water-soluble polyacrolein-bisulfite adduct. The concentration could be taken to as high as 25% polyacrolein without danger of gelation. The resulting solution having the high solids content was used as an adhesive for bonding maple blocks. The solution was applied by means of a doctor blade, the blocks were placed face to face, and the assembly placed in a steam heated platen press and cured at 285° F. for 10 minutes under pressure of 200 p.s.i. The resulting assembly had excellent strength and good resistance to water.

In a related experiment wherein the acrolein was polymerized in a water medium without the acetone, the resulting product took longer to dissolve in the aqueous bisulfite solution and the resulting solution gelled at a polyacrolein content of about 10%.

Example II

Example I was repeated with the exception that 1.6 parts of a surface active agent (ethylene oxide adduct of phenol) were included in the charge, aqueous sodium bisulfite adjusted to pH 4 was substituted for sulfur dioxide as the reductant, and the reaction period was extended to 16 hours. The resulting product was a finely divided solid white polymer of acrolein having an intrinsic viscosity of 0.14 dl./g. The polymer had an aldehyde function of 99.4%. The product could be easily dissolved in aqueous sodium bisulfite solution to form a solution of about 30% polyacrolein content.

Example III

Example II was repeated with the exception that the amount of redox catalyst employed was reduced from 10 millimoles to 2 millimoles per mol of acrolein. The resulting product was a finely divided sold white polymer of acrolein having an intrinsic viscosity of 0.35 dl./g. and an aldehyde function of 99%. The product could be easily dissolved in aqueous sodium bisulfite solution to form a solution of about 25% polymer.

Example IV

Example I was repeated with the exceptions that the amount of water was reduced to 1 part and the reaction period extended to 20 hours. The resulting product was a finely divided white solid polymer of acrolein having an intrinsic viscosity of 0.25 dl./g. and an aldehyde function of 99%. This product could also be easily dissolved in aqueous bisulfite to give a solution of about 20% polyacrolein content.

Example V

Example IV was repeated with the exception that 0.25 mole allyl alcohol per mole of acrolein was added to the reaction mixture to act as a chain transfer agent. The resulting product was a finely divided white solid polymer of acrolein having an intrinsic viscosity of 0.11 dl./g. This product could also be easily dissolved in aqueous sodium bisulfite to give a solution of 30% polyacrolein content.

Example VI

Example V was repeated with the change in concentrations of water and allyl alcohol as indicated in the table. The resulting products were all low moclear weight having an aldehyde function of 99+% which could be easily dissolved in sodium bisulfite solution.

| Ex. No. | Amount of allyl alcohol, moles per mole acrolein | Water, percent | Peroxide, millimoles per mole acrolein | I.V. of product, dl./g. |
|---|---|---|---|---|
| DB-94 | 0.10 | 8 | 10 | 0.13 |
| DMK-2 | 0.05 | 8 | 10 | 0.13 |
| DMK-3 | 0.02 | 16 | 10 | 0.13 |
| DMK-4 | 0.02 | 8 | 10 | 0.15 |

Example VII

Example I was repeated with the exception that the reaction solvent was made up of 50% acetone and 50% water. The resulting product was a finely divided white solid polymer having an intrinsic viscosity of 0.29 dl./g.

Example VIII

Example IV was repeated with the exception that methyl ethyl ketone rather than acetone was used as reaction solvent. The resulting product was a finely divided white solid polymer having a high aldehyde function and an intrinsic viscosity of 0.11 dl./g.

Example IX

A modified starch solution was prepared by cooking 140 parts of Penford Gum 280 (a low viscosity hydroxethyl ether derivative of corn starch) in 560 parts of water for 30 minutes at 85° C. A polyacrolein-sodium bisulfite solution was prepared as in Example I. This solution and the starch solution were adjusted to pH of 9–11. The mixtures were then combined to give a product having 8.9% by weight of starch and 0.22% by weight of polyacrolein derivative. The resulting mixture was spread out on surfaces and dried to a hard water-insoluble coating.

*Example X*

The polymer of acrolein prepared in Example I was suspended in a methanol-acetone mixture and refluxed with p-toluenesulfonic acid. After solubilization and workup of the acetal, moldings are prepared which have good strength.

*Example XI*

Examples I to V are repeated with the exception that 5% of the acrolein are replaced with each of the following: acrylonitrile, ethyl acrylate and methyl methacrylate. Copolymers having related properties to the polyacrolein are obtained.

*Example XII*

The following were charged to a glass reactor:

49.25 parts acetone,
100 parts of acrolein,
8.75 parts of a 5% solution in acetone of tertiary butyl hydroperoxide,
71.00 parts water,
13.00 parts of an aqueous solution of a polyacrolein-$SO_2$ adduct as reducing agent.

This mixture was kept at room temperature for about 24 hours. The polymer was recovered as a finely divided powder identified as polyacrolein having an intrinsic viscosity of 0.30 dl./g. The polymer could be easily dissolved in aqueous sulfur dioxide to form a water-soluble derivative useful in adhesives.

*Example XIII*

The following were charged to the reactor:

151.50 parts of acetone,
60.00 parts of acrolein,
5.25 parts of a 5% solution in acetone of tertiary butyl hydroperoxide,
42.60 parts of water,
7.80 parts of an aqueous solution of a preformed polyacrolein-$SO_2$ adduct as reducing agent.

This mixture was kept at room temperature for about 24 hours. The polymer was recovered as a finely divided powder identified as polyacrolein having an intrinsic viscosity of 0.25 dl./g. The polymer could be easily dissolved in aqueous sulfur dioxide to form a water-soluble derivative useful in adhesives.

We claim as our invention:

1. A process for preparing polymers of alpha,beta-ethylenically unsaturated monoaldehydes containing up to 8 carbon atoms recoverable as a finely divided substantially dry powder which comprises effecting polymerization of the aldehyde in a mixture of water and a lower aliphatic ketone containing a total of not more than 8 carbon atoms using a redox catalyst system.

2. A process for preparing low molecular weight polymers of an alpha,beta-ethylenically unsaturated monoaldehyde containing up to 8 carbon atoms recoverable as a finely divided substantially dry powder which comprises effecting the polymerization of the monoaldehyde in a reaction medium containing a lower aliphatic ketone containing a total of not more than 8 carbon atoms and water, the amount of water making up to not more than 20% by weight of said reaction medium, and using a peroxide-reducing agent catalyst.

3. A process as in claim 2 wherein the unsaturated aldehyde is acrolein.

4. A process as in claim 2 wherein the unsaturated aldehyde is methacrolein.

5. A process as in claim 2 wherein the is acetone.

6. A process as in claim 2 wherein the peroxide catalyst is tertiary butyl hydroperoxide.

7. A process as in claim 2 wherein the polymerization is conducted at a temperature between 10° C. and 100° C.

8. A process as in claim 2 wherein the reaction mixture is agitated during the reaction and conducted under nitrogen.

9. A process for preparing polymers of acrolein which are readily soluble in sulfur dioxide which comprises contacting the acrolein in a water-acetone mixture containing from 1% to 20% water, with a peroxide catalyst, a sulfur-containing reducing agent, and agitating the mixture during the course of the polymerization, the reaction being accomplished at a temperature between 15° C. and 100° C.

10. A process for preparing copolymers of acrolein and a dissimilar ethylenically unsaturated monomer selected from the group consisting of alpha,beta-ethylenically unsaturated nitriles, alkyl esters of acrylic and alpha-substituted acrylic acids, vinyl esters of monocarboxylic acids, allyl esters of monocarboxylic acids, olefins, diolefins, unsaturated esters of polycarboxylic acids, and amides of unsaturated carboxylic acids, all members of the foregoing containing not more than 12 carbon atoms each, which copolymer is recoverable as a finely divided substantially dry powder, which comprises contacting the mixture of acrolein and dissimilar monomer in a water-acetone mixture which contains from 1% to 20% by weight of water, with a peroxide catalyst, and sulfur-containing reducing agent, and agitating the mixture during the course of the polymerization, the reaction being accomplished at a temperature between 15° C. and 100° C.

11. A process as in claim 10 wherein the dissimilar monomer is acrylonitrile.

12. A process as in claim 10 wherein the dissimilar monomer is an alkyl acrylate.

13. A process as in claim 10 wherein the dissimilar monomer is methyl methacrylate.

No references cited.

WILLIAM H. SHORT, *Primary Examiner.*

L. M. PHYNES, *Assistant Examiner.*